US008143873B2

(12) United States Patent
Hane

(10) Patent No.: US 8,143,873 B2
(45) Date of Patent: Mar. 27, 2012

(54) STEP-UP SWITCHING POWER SUPPLY CIRCUIT

(75) Inventor: Norimasa Hane, Tokyo (JP)

(73) Assignee: Torex Semiconductor Ltd., Tokyo (JP)

( * ) Notice: Subject to any disclaimer, the term of this patent is extended or adjusted under 35 U.S.C. 154(b) by 322 days.

(21) Appl. No.: 12/552,659

(22) Filed: Sep. 2, 2009

(65) Prior Publication Data

US 2010/0060251 A1     Mar. 11, 2010

(30) Foreign Application Priority Data

Sep. 8, 2008 (JP) .................. 2008-230307

(51) Int. Cl.
G05F 1/40 (2006.01)
(52) U.S. Cl. ....................... 323/282; 323/285
(58) Field of Classification Search .................. 323/222, 323/225, 282, 284, 285, 288, 351; 363/59, 363/60
See application file for complete search history.

(56) References Cited

U.S. PATENT DOCUMENTS

| 7,215,189 B2 * | 5/2007 | Wilhelm | 327/589 |
| 7,502,239 B2 * | 3/2009 | Itoh | 363/60 |
| 7,812,580 B2 * | 10/2010 | Watanabe et al. | 323/268 |
| 7,893,673 B2 * | 2/2011 | Omi | 323/282 |
| 2009/0251118 A1 | 10/2009 | Omi | |
| 2010/0007999 A1 * | 1/2010 | Iwata | 361/18 |

FOREIGN PATENT DOCUMENTS

JP         2006304500 A    11/2006

* cited by examiner

Primary Examiner — Jessica Han
(74) Attorney, Agent, or Firm — The Webb Law Firm

(57) ABSTRACT

A step-up switching power supply circuit is provided. Within a delay period immediately after start of operation, a switching element (SW2) is subjected to constant-current control by a switching control signal (E) of a constant-current source buffer circuit (9). Control is also effected such that during halt of control for a stepping-up action in this circuit, or within the delay period, when an output voltage (VOUT)<an input voltage (VIN), a switching element (SW3) is brought into the ON state, and simultaneously, a switching element (SW4) is brought into the OFF state, or when VOUT>VIN, the switching element (SW3) is brought into the OFF state, and simultaneously, the switching element (SW4) is brought into the ON state, and after a lapse of the delay period, the switching element (SW3) is in the OFF state, and the switching element (SW4) is in the ON state, no matter which of the output voltage (VOUT) and the input voltage (VIN) is higher when compared by a comparator (12).

7 Claims, 5 Drawing Sheets

STEP-UP SWITCHING POWER SUPPLY CIRCUIT

The entire disclosure of Japanese Patent Application No. 2008-230307 filed Sep. 8, 2008 is expressly incorporated by reference herein.

TECHNICAL FIELD

This invention relates to a step-up switching power supply circuit and, more specifically, to that useful when applied in adopting a structure for preventing an input voltage by a power supply from being applied to an output terminal during halt of a stepping-up action of the switching power supply circuit.

BACKGROUND ART

Among switching power supply circuits is that which steps up a power supply voltage and outputs it, namely, a so-called step-up switching power supply circuit. FIG. 6 is a circuit diagram showing a typical step-up switching power supply circuit according to an earlier technology. As shown in this drawing, when a switching element SW1 formed from an N-type MOSFET is turned on in this switching power supply circuit, a coil current IL flows from a power supply 1 via a coil L and the switching element SW1, whereby energy is accumulated in the coil L. Then, the switching element SW1 is turned off, whereupon a counter electromotive force based on the energy accumulated during the on-period of the switching element SW1 is superposed on an input voltage VIN which is the output of the power supply 1. As a result, an output voltage VOUT stepped up to a predetermined voltage can be obtained at an output terminal OUT via a Schottky diode SBD. Here, a capacitor CL functions as a smoothing capacitor for an output current IOUT, while a capacitor CFB functions as a phase compensation capacitor.

On the other hand, the output voltage VOUT at the output terminal OUT is divided at a predetermined ratio by a resistor RFB1 and a resistor RFB2, and supplied to one input terminal of an error amplifier 2. The error amplifier 2 outputs an error signal Verr representing a deviation between the voltage divided from the output voltage VOUT and a predetermined reference voltage VREF supplied to the other input terminal. A PWM comparator 3 compares the error signal Verr with a ramp signal RAMP generated by a ramp generator 4 to form a PWM signal PWM, and outputs the PWM signal PWM. The switching element SW1 has its on-off action controlled by a switching control circuit 5 based on the PWM signal PWM. In this manner, the on-period of the switching element SW1 is controlled based on the duty of the PWM signal PWM, whereby the output voltage VOUT is adjusted to a predetermined value. A phase compensation circuit 6 performs the phase compensation of the error amplifier 2 in a high frequency band.

With such a step-up switching power supply circuit, even when the switching control of the switching element SW1 is stopped in terminating the stepping-up action of the step-up switching power supply circuit, the input voltage VIN is outputted, unchanged, to the output terminal OUT.

This problem is solved by using a switching element in place of the Schottky diode SBD, and cutting off the power supply side from the load side with the use of this switching element. If this switching element is formed from MOSFET, however, the problem arises that the power supply side and the load side are connected by a parasitic diode inherent in the MOSFET.

Patent Document JP-A-2006-304500 is present as a publicly known document which discloses a step-up switching power supply circuit solving the above-mentioned problem. The step-up switching power supply circuit disclosed in Patent Document JP-A-2006-304500 is composed of a first MOSFET which is a P-type switching element connected between the output side of a coil and an output terminal, and in addition to the first MOSFET, a second MOSFET as a P-type switching element which is connected between the output terminal and the back gate of the first MOSFET and whose gate is connected to an input terminal, and a third MOSFET as a P-type switching element which is connected between the input terminal and the back gate of the first MOSFET and whose gate is connected to the output terminal.

Because of the above-described configuration, not only a current path routed by the first MOSFET, but also a current path mediated by a parasitic diode incidental thereto can be shut down by the second MOSFET when a stepping-up action is stopped.

SUMMARY OF INVENTION

[Technical Problem]

Generally, when MOSFET has the potential of its back gate in a floating state, the element may be broken by latch-up. At the start of the step-up switching power supply circuit disclosed in Patent Document JP-A-2006-304500, the first to third MOSFETs are all in the OFF state, and thus the voltages of their back gates are inconstant.

At the start of the step-up switching power supply circuit disclosed in Patent Document JP-A-2006-304500, moreover, the problem is also involved that a large inrush current flows to the first MOSFET.

The present invention has been accomplished in the light of the above-mentioned earlier technology. It is an object of the present invention to provide a step-up switching power supply circuit which can be cut off from a load so that an input voltage does not occur in an output when a stepping-up action is stopped, which can fix the potential of the back gate of MOSFET, and which can effectively suppress an inrush current at the start of operation.

SUMMARY OF THE INVENTION

A first aspect of the present invention for attaining the above object is a step-up switching power supply circuit which controls a first switching element based on an output signal of an error amplifier for detecting a deviation between an output voltage and a reference value, and which obtains the output voltage, stepped up by superposing a voltage based on energy accumulated in a coil on an input voltage, via an output terminal, the step-up switching power supply circuit comprising: a second switching element connected between an output side of the coil and the output terminal and comprising a P-MOSFET; a first diode having an anode connected to the output side of the coil; a second diode having an anode connected to the output terminal and having a cathode connected to a cathode of the first diode, a point of connection between the cathodes being connected to a back gate of the second switching element; a third switching element connected between the output side of the coil and the back gate of the second switching element and comprising a P-MOSFET, a back gate of the third switching element being connected to the back gate of the second switching element; a fourth switching element connected between the output terminal and the back gate of the second switching element and comprising a P-MOSFET, a back gate of the fourth switching element being connected to the back gate of the second switching element; delay means for delaying start of control for a stepping-up action by a certain time; constant-current drive means for driving the second switching element at a constant current within a delay period by the delay means; first switching control means for exercising on-off control of the first switching element and the second switching element alternately after a lapse of the delay period; and second switching control means for effecting switching control such that during halt of the control for the stepping-up action, or within the delay period, when the input voltage is higher than the output voltage upon comparison by a comparator, the third switching element is turned on, and the fourth switching element is turned off, or when the input voltage is lower than the output voltage upon comparison by the comparator, the third switching element is turned off, and the fourth switching element is turned on, and after the lapse of the delay period, the third switching element is turned off, and the fourth switching element is turned on, no matter which of the input voltage and the output voltage is higher when compared by the comparator.

A second aspect of the present invention is the step-up switching power supply circuit according to the first aspect, wherein the comparator is adapted to compare a voltage obtained by superposing a predetermined voltage on the input voltage with the output voltage.

A third aspect of the present invention is the step-up switching power supply circuit according to the first or second aspect, wherein the input voltage or the output voltage, whichever is higher based on an output of the comparator, is selected and used as a power supply voltage.

A fourth aspect of the present invention is the step-up switching power supply circuit according to any one of the first to third aspects, wherein a buffer circuit is provided between the first switching control means and a gate of the second switching element, and the buffer circuit is adapted to be stopped within the delay period and, after the lapse of the delay period, exercise the on-off control of the second switching element based on switching control of the first switching control means.

A fifth aspect of the present invention is the step-up switching power supply circuit according to any one of the first to fourth aspects, which is composed of an integrated circuit.

A sixth aspect of the present invention is the step-up switching power supply circuit according to the fifth aspect, wherein the delay means is adapted to delay the start of the control for the stepping-up action by the certain time from a point in time when an enable circuit becomes capable of driving the integrated circuit.

A seventh aspect of the present invention is the step-up switching power supply circuit according to the fifth or sixth aspect, wherein the integrated circuit has a pin to which an external capacitor for stabilizing an action of the integrated circuit can be connected.

[Advantageous Effects of Invention]

According to the present invention, the electric current path leading from the input side to the output side during halt of the stepping-up action is blocked by the second diode, with the result that the input voltage does not appear at the output terminal. In addition, the on-off control by the second switching control means establishes the on- or off-state of the third or the fourth switching element formed from the MOSFET element, even at the start of the step-up switching power supply circuit, and the third to fourth switching elements do not become OFF at the same time. As a result, the potentials at the second to fourth back gates connected to each other do not become inconstant, and the instability or disruption of the action of the switching element by a latching current or the like can be prevented.

Furthermore, the second switching element is driven at a constant current by the constant-current drive means for a certain period at the start of the step-up switching power supply circuit. Thus, a great starting current does not flow to the second switching element.

DETAILED DESCRIPTION OF THE INVENTION

The embodiments and Examples of the present invention will now be described in detail with reference to the accompanying drawings.

Figure 1:
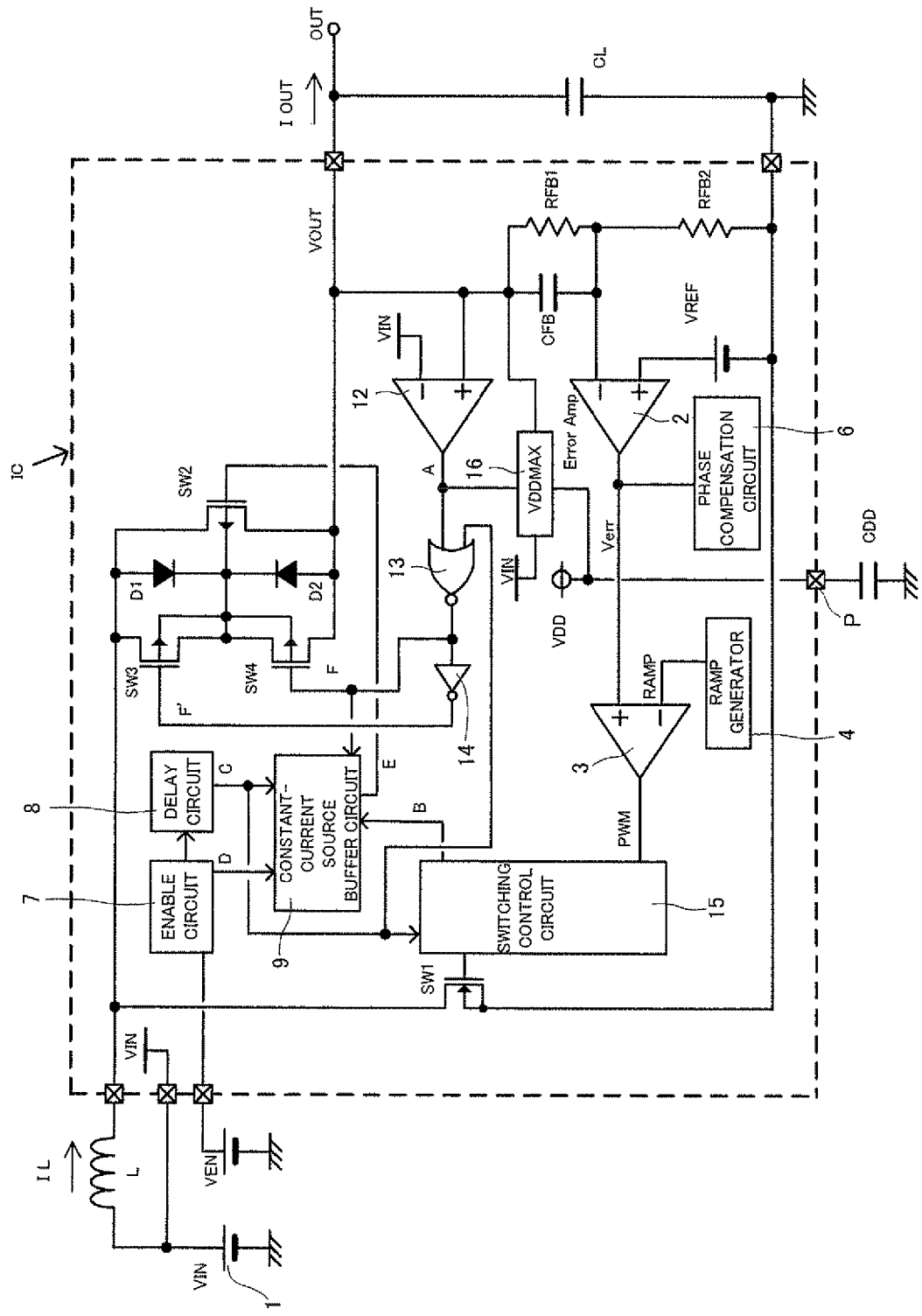
FIG. 1 is a circuit diagram showing a step-up switching power supply circuit according to a first embodiment of the present invention.
Figure 6:
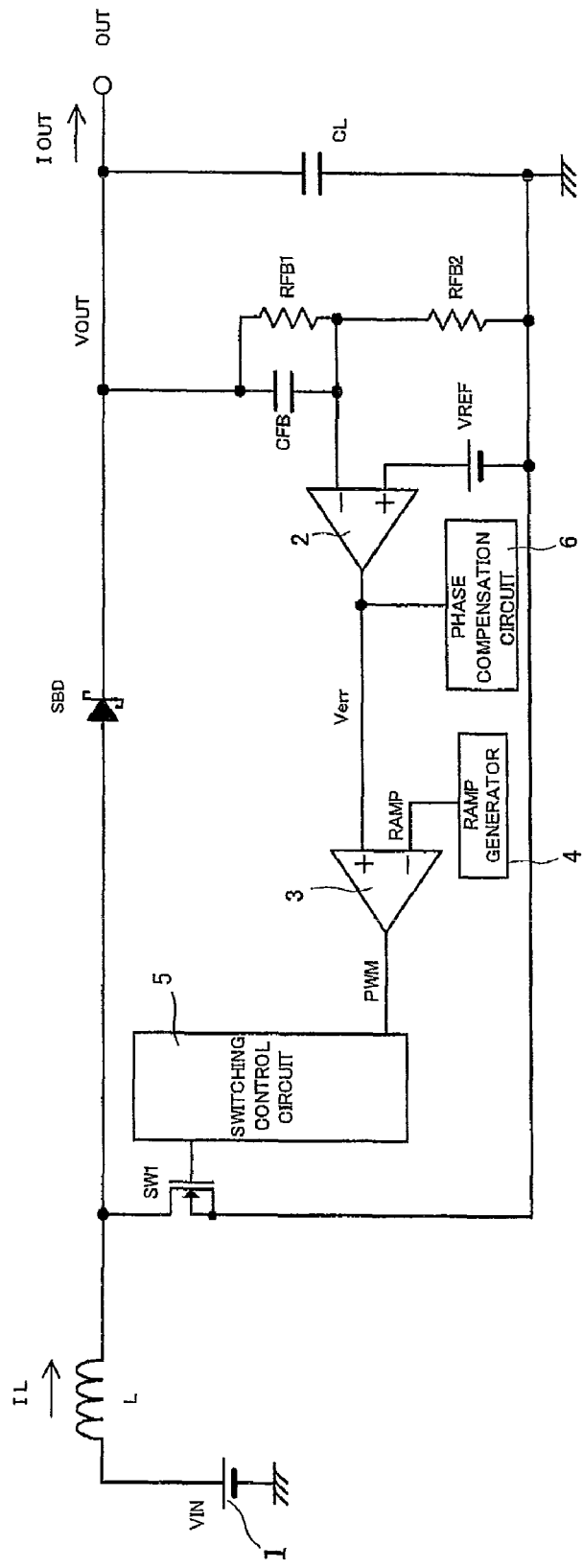
FIG. 6 is a circuit diagram showing a step-up switching power supply circuit according to the earlier technology.

First Embodiment:

FIG. 1 is a circuit diagram showing a switching power supply circuit according to a first embodiment of the present invention. The present embodiment has a predetermined control circuit added to the step-up switching power supply circuit shown in FIG. 6. Thus, the same portions as those in FIG. 6 are assigned the same numerals or symbols as in FIG. 6, and duplicate explanations are omitted.

As shown in FIG. 1, a second switching element SW2 formed from a P-type MOSFET is connected between the output side of a coil L and an output terminal OUT, and turned on or off alternately with a first switching element SW1 formed from an N-type MOSFET. A first diode D1, which is one parasitic diode of the second switching element SW2, has an anode connected to the output side of the coil L, while a second diode D2, which is another parasitic diode of the second switching element SW2, has an anode connected to the output terminal OUT. A cathode of the first diode D1 and a cathode of the second diode D2 are connected to each other, and their connection point is connected to a back gate of the second switching element SW2.

A third switching element SW3 formed from a P-type MOSFET is connected, together with its back gate, between the output side of the coil L and the back gate of the second switching element SW2. A fourth switching element SW4 formed from a P-type MOSFET is connected, together with its back gate, between the output terminal OUT and the back gate of the second switching element SW2.

An enable circuit 7 delivers an enable signal D, which permits the action of each circuit element, to a delay circuit 8 and a constant-current source buffer circuit 9. The delay circuit 8 sends out a delay signal C, which is the enable signal D whose rise has been delayed by a certain time, to the constant-current source buffer circuit 9 and a switching control circuit 15.

The switching control circuit 15 exercises the on-off control of the first switching element SW1 and the second switching element SW2 alternately after a lapse of a delay period defined by the delay signal C. The switching control of the second switching element SW2 by the switching control circuit 15 is effected via a switching control signal E which is formed by supplying a switching control signal B to the constant-current source buffer circuit 9 (this point will be described in detail later).

Figure 2:
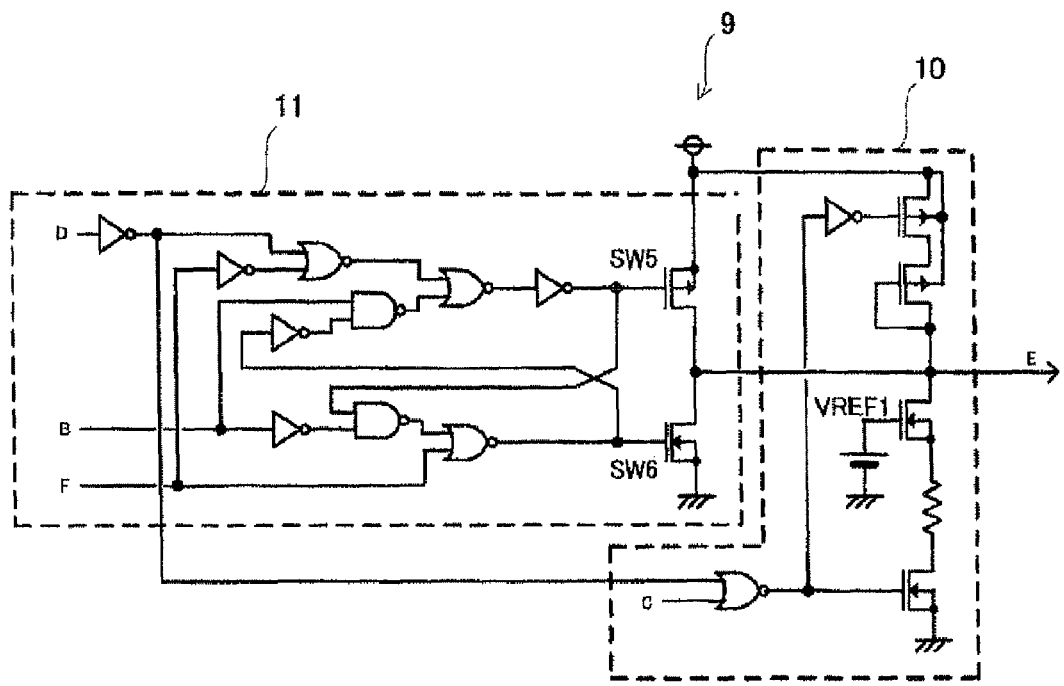
FIG. 2 is a circuit diagram showing the details of a constant-current source buffer circuit in FIG. 1.

The constant-current source buffer circuit 9 has a constant-current circuit 10 and a buffer circuit 11, as will be shown in an extracted manner and in detail in FIG. 2. The actions of the constant-current source buffer circuit 9, which will be described in detail later, are such that from the time when the enable signal D rises until the delay period set in the delay circuit 8 elapses, namely, until the delay signal C rises, the action of the buffer circuit 11 is stopped, and the switching control signal E, which is a constant-voltage signal based on a reference voltage VREF1 of the constant-current circuit 10, is supplied from the constant-current circuit 10 to the gate of the switching element SW2. As a result, a predetermined constant current flows to the switching element SW2. At this time, switching elements SW5 and SW6 at the output stage of the buffer circuit 11, which accepts the enable signal D, the switching control signal B and a switching control signal F as inputs to the logical circuits, are both in the OFF state. On the other hand, after the lapse of the delay period, the action of the constant-current circuit 10 is stopped, and the switching control of the switching element SW2 is effected by the switching control circuit 15 via the buffer circuit 11.

The switching elements SW3 and SW4 are subjected to switching control by a logical circuit comprising a comparator 12, a NOR circuit 13, and an inverter 14. The comparator 12 compares an output voltage VOUT with an input voltage VIN, and when VOUT>VIN, its output signal A is in the H-state. One of the input terminals of the NOR circuit 13 is supplied with the output signal A, while the other input terminal is supplied with the delay signal C. An output signal from the NOR circuit 13 serves as the switching control signal F, which is supplied to the gate of the switching element SW4. The gate of the switching element SW3 is supplied with a switching control signal F' which is the inverted from of the switching control signal F inverted by the inverter 14. Thus, when VOUT<VIN during halt of control for the stepping-up action in this circuit, or within the delay period by the delay signal C, the third switching element SW3 is brought into the ON state, and at the same time, the switching element SW4 is brought into the OFF state. When VOUT>VIN, by contrast, the third switching element SW3 is brought into the OFF state, and at the same time, the switching element SW4 is brought into the ON state. After the lapse of the delay period by the delay signal C, on the other hand, control is effected such that the third switching element SW3 is in the OFF state, and the fourth switching element SW4 is in the ON state, no matter which of the output voltage VOUT and the input voltage VIN is higher when compared by the comparator 12.

Figure 3:
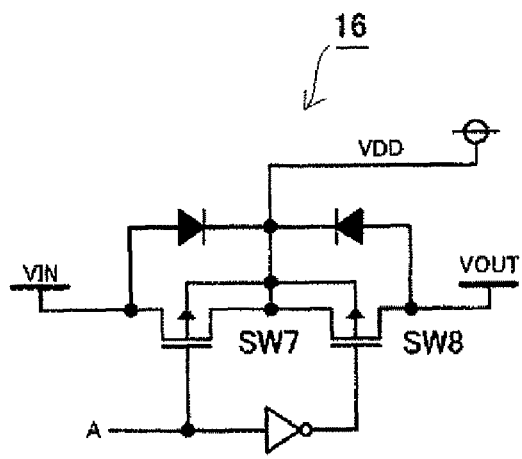
FIG. 3 is a circuit diagram showing the details of a power supply voltage selection circuit in FIG. 1.

A power supply voltage selection circuit 16 is designed to select the input voltage VIN or the output voltage VOUT, whichever is higher, based on the output signal A of the comparator 12, and use it as a power supply voltage VDD. More specifically, as indicated by its extracted form in FIG. 3, the power supply voltage selection circuit 16 has switching elements SW7 and SW8 and, when the switching element SW7 is turned on by the output signal A, the input voltage VIN is selected and used as the power supply voltage VDD; when the switching element SW8 is turned on by the output signal A, the output voltage VOUT is selected and used as the power supply voltage VDD. As for the step-up switching power supply circuit, the respective circuit elements except for the power supply 1, the coil L and the smoothing capacitor CL are integrated as an integrated circuit IC. The integrated circuit IC has a pin P to which an external capacitor CDD for stabilizing the action of the integrated circuit IC can be connected, and the capacitor CDD is connected to the integrated circuit IC via the pin P.

Figure 4:
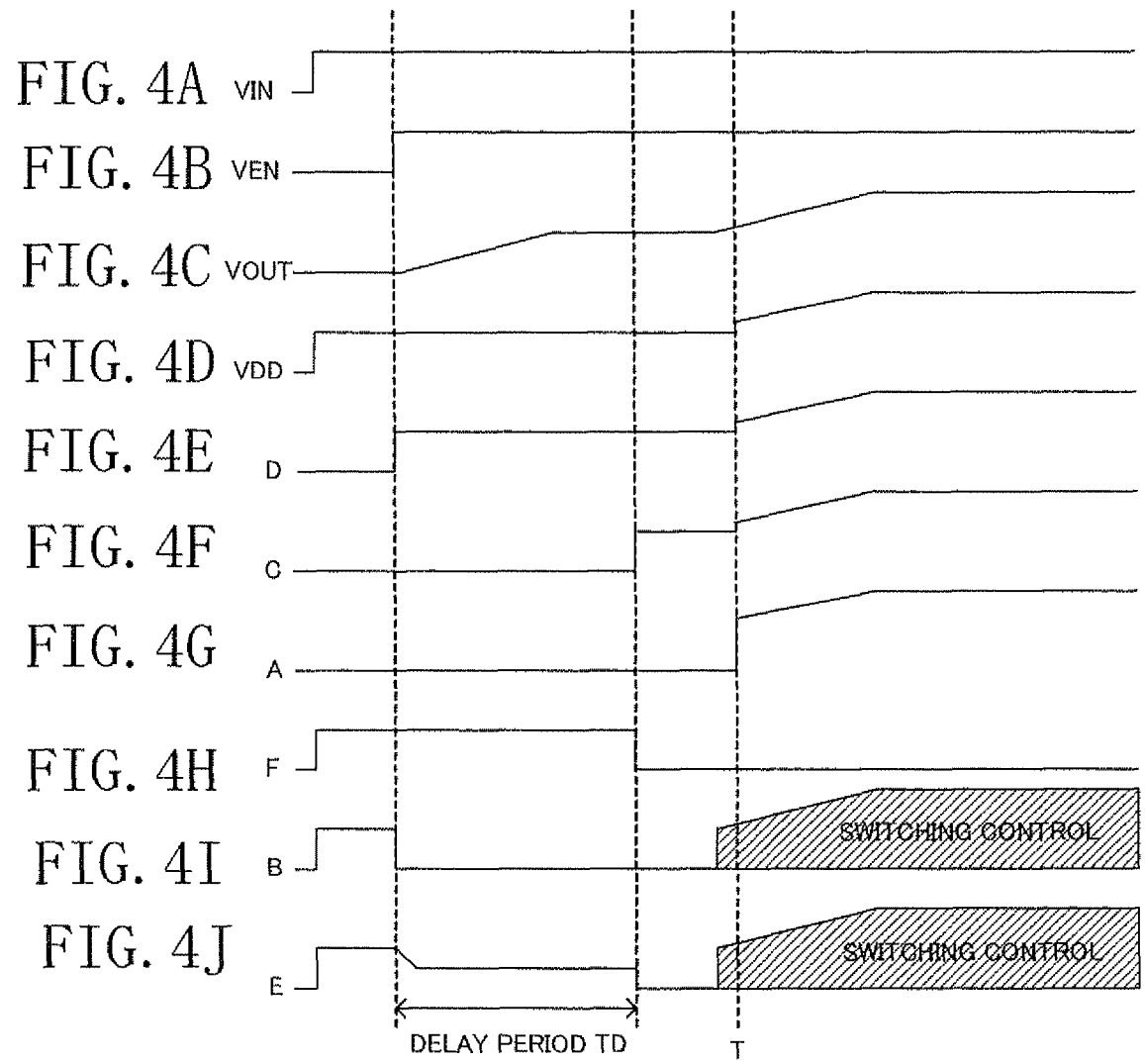
FIG. 4 is a waveform chart showing the waveforms of respective portions in FIG. 1.

The actions of the present embodiment described above will be explained by adding a waveform chart as FIG. 4. First, the power supply 1 is turned on, whereby the input voltage VIN rises (see FIG. 4A). Thus, the power supply voltage VDD (see FIG. 4D), and the switching control signals F, B and E (see FIG. 4H, FIG. 4I and FIG. 4J) rise.

Then, with the rise of the enable voltage signal VEN (FIG. 4B), the enable signal D (FIG. 4E) rises, whereupon the actions of the respective portions of the integrated circuit IC are started. That is, the delay action in the delay circuit 8 is started and, after a lapse of a predetermined delay period TD, the delay signal C rises (see FIG. 4F). In the delay period TD, the relationship between the output voltage VOUT (FIG. 4C) and the input voltage VIN is that VIN>VOUT. Thus, the output signal A of the comparator 12 (see FIG. 4G) is in the L-state. As a result, control is exercised to bring the switching element SW3 into the ON state and the switching element SW4 into the OFF state. That is, the potentials at the back gates of the switching elements SW2, SW3 and SW4 are not in a floating state.

In the delay period TD, the switching control signal F is in the H-state. As a result, the switching elements SW5 and SW6 of the buffer circuit 11 (see FIG. 2; the same applies hereinafter) are both controlled to the OFF state, so that the switching control signal E is not sent out from the buffer circuit 11. In the delay period TD, the delay signal C is in the L-state. As a result, the switching control signal E, which is a constant-voltage signal based on the reference voltage VREF1, is supplied from the constant-current circuit 10 (see FIG. 2; the same applies hereinafter) to the gate of the switching element SW2. Consequently, the switching element SW2 starts its action at the predetermined constant current. That is, the delay period TD is provided, and control is exercised so as to flow a constant current during this delay period TD, whereby an inrush current at the start of operation can be suppressed.

When the input voltage VIN is higher than the output voltage VOUT upon comparison by the comparator 12 during halt of control for the stepping-up action or within the delay period TD, control is exercised to turn on the switching element SW3 and turn off the switching element SW4. Thus, an electric current, which is ascribed to the input voltage VIN and is about to flow toward the output side, is blocked by the diode D2. As a result, the influence of the input voltage VIN is not exerted on the output side.

When the input voltage VIN is lower than the output voltage VOUT upon comparison by the comparator 12 during halt of control for the stepping-up action, control is exercised to turn off the switching element SW3 and turn on the switching element SW4. Thus, an electric current, which is ascribed to the output voltage VOUT and is about to flow toward the input side, is blocked by the diode D1. As a result, the influence of the output voltage VOUT is not exerted on the input side.

After the lapse of the delay period TD, the rise of the delay signal C stops the action of the constant-current circuit 10. On the other hand, after the lapse of the delay period TD, the fall of the switching control signal F results in the start of ordinary switching control by the switching control signals B and E (shaded regions in FIG. 4I and FIG. 4J). After the lapse of the delay period TD, control is effected such that the switching element SW3 is turned off, and the switching element SW4 is turned on, no matter which of the input voltage VIN and the output voltage VOUT is higher when compared by the comparator 12.

The output voltage VOUT gradually increases with the rise of the enable signal D, reaches a constant value, and then, upon start of the switching control, gradually increases again. As a result, with a certain timing T immediately after start of the switching control, the input voltage VIN<the output voltage VOUT. Thus, as explained based on FIG. 3, the output voltage VOUT is selected, in place of the input voltage VIN adopted until then, as the power supply voltage VDD. Accordingly, the enable signal D, the delay signal C, and the output signal A also gradually increase following the power supply voltage VDD.

Figure 5:
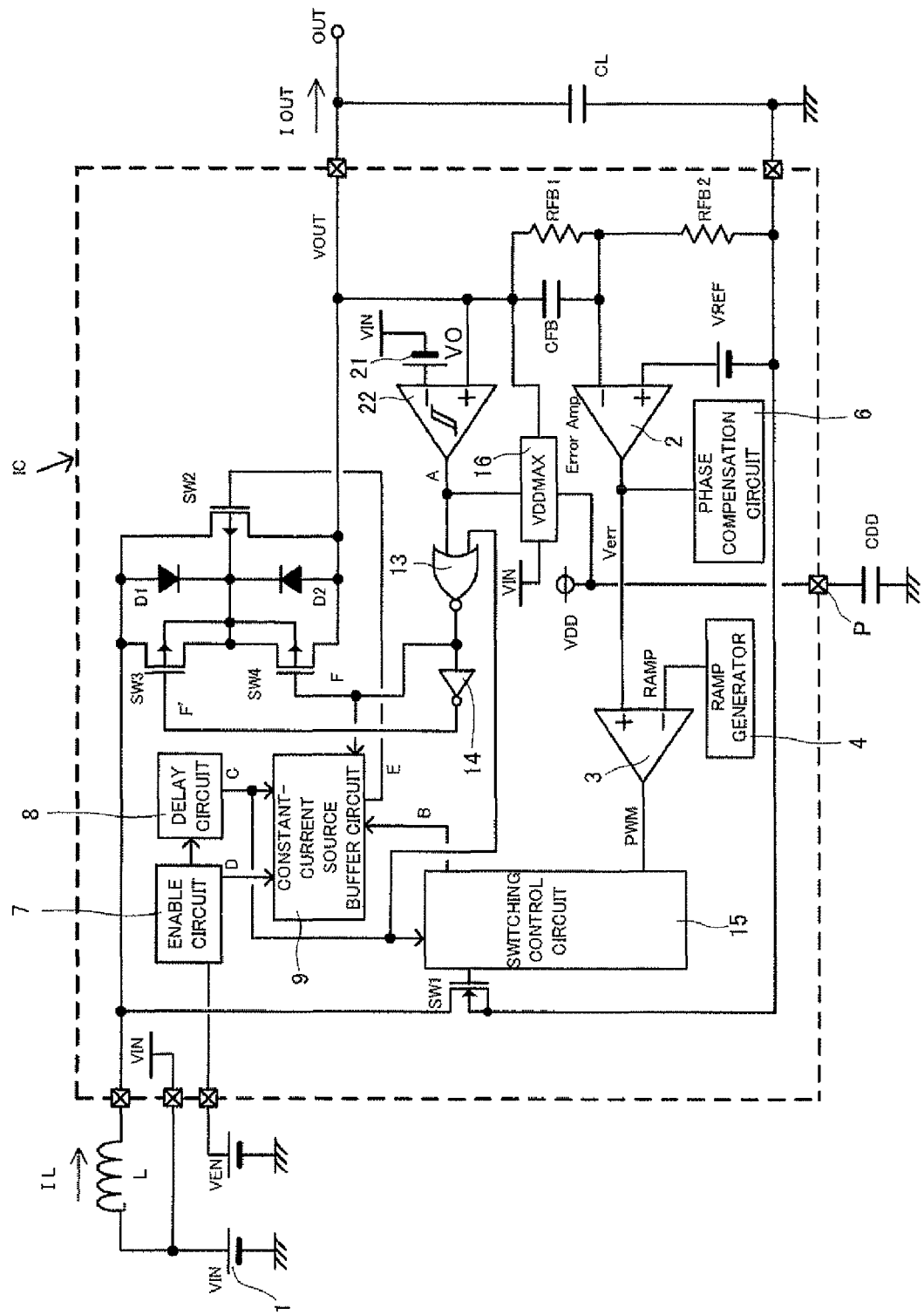
FIG. 5 is a circuit diagram showing a step-up switching power supply circuit according to a second embodiment of the present invention.

Second Embodiment:

FIG. 5 is a circuit diagram showing a control circuit of a switching power supply circuit according to a second embodiment of the present invention. The present embodiment involves a change in the configuration of the comparator 12 of the step-up switching power supply circuit shown in FIG. 1, and the other configurations are exactly the same as those in FIG. 1. Thus, the same portions as those in FIG. 1 are assigned the same numerals or symbols as in FIG. 1, and duplicate explanations are omitted.

A comparator 22 in the step-up switching power supply circuit according to the present embodiment is adapted to compare a voltage obtained by superposing a predetermined voltage VO on an input voltage VIN (namely, VIN+VO) with an output voltage VOUT. The voltage VO is superposed by a power supply 21.

As a result, when (input voltage VIN+voltage VO) >output voltage VOUT, the output signal A rises. That is, even if the output voltage VOUT causes chattering in a voltage region upward and downward of and in the vicinity of the input voltage VIN, its influence is cancelled out, so that a stable comparing action can be performed.

[Industrial Applicability]

The present invention can be used, for example, in the industrial field of electronic equipment where a switching power supply circuit for forming a power supply circuit in a cellular phone or a personal computer is produced and marketed.

The invention claimed is:

1. A step-up switching power supply circuit which controls a first switching element based on an output signal of an error amplifier for detecting a deviation between an output voltage and a reference value, and which obtains the output voltage, stepped up by superposing a voltage based on energy accumulated in a coil on an input voltage, via an output terminal, the step-up switching power supply circuit comprising:
   a second switching element connected between an output side of the coil and the output terminal and comprising a P-MOSFET;
   a first diode having an anode connected to the output side of the coil;
   a second diode having an anode connected to the output terminal and having a cathode connected to a cathode of the first diode, a point of connection between the cathodes being connected to a back gate of the second switching element;
   a third switching element connected between the output side of the coil and the back gate of the second switching element and comprising a P-MOSFET, a back gate of the third switching element being connected to the back gate of the second switching element;
   a fourth switching element connected between the output terminal and the back gate of the second switching element and comprising a P-MOSFET, a back gate of the fourth switching element being connected to the back gate of the second switching element;
   delay means for delaying start of control for a stepping-up action by a certain time;
   constant-current drive means for driving the second switching element at a constant current within a delay period by the delay means;
   first switching control means for exercising on-off control of the first switching element and the second switching element alternately after a lapse of the delay period; and
   second switching control means for effecting switching control such that during halt of the control for the stepping-up action, or within the delay period, when the input voltage is higher than the output voltage upon comparison by a comparator, the third switching element is turned on, and the fourth switching element is turned off, or when the input voltage is lower than the output voltage upon comparison by the comparator, the third switching element is turned off, and the fourth switching element is turned on, and after the lapse of the delay period, the third switching element is turned off, and the fourth switching element is turned on, no matter which of the input voltage and the output voltage is higher when compared by the comparator.

2. The step-up switching power supply circuit according to claim 1, wherein
   the comparator is adapted to compare a voltage obtained by superposing a predetermined voltage on the input voltage with the output voltage.

3. The step-up switching power supply circuit according to claim 1, wherein
   the input voltage or the output voltage, whichever is higher based on an output of the comparator, is selected and used as a power supply voltage.

4. The step-up switching power supply circuit according to claim 1, wherein
   a buffer circuit is provided between the first switching control means and a gate of the second switching element, and
   the buffer circuit is adapted to be stopped within the delay period and, after the lapse of the delay period, exercise the on-off control of the second switching element based on switching control of the first switching control means.

5. The step-up switching power supply circuit according to claim 1, which is composed of an integrated circuit.

6. The step-up switching power supply circuit according to claim 5, wherein
   the delay means is adapted to delay the start of the control for the stepping-up action by the certain time from a point in time when an enable circuit becomes capable of driving the integrated circuit.

7. The step-up switching power supply circuit according to claim 5, wherein
   the integrated circuit has a pin to which an external capacitor for stabilizing an action of the integrated circuit can be connected.

* * * * *